US010729074B2

(12) United States Patent
Kringstad

(10) Patent No.: US 10,729,074 B2
(45) Date of Patent: *Aug. 4, 2020

(54) CROP CART LOADING SYSTEM

(71) Applicant: Safe-T-Pull, Inc., Park River, ND (US)

(72) Inventor: Jacob L. Kringstad, Park River, ND (US)

(73) Assignee: Safe-T-Pull, Inc., Park River, ND (US)

(*) Notice: Subject to any disclaimer, the term of this patent is extended or adjusted under 35 U.S.C. 154(b) by 0 days.

This patent is subject to a terminal disclaimer.

(21) Appl. No.: 16/396,733

(22) Filed: Apr. 28, 2019

(65) Prior Publication Data

US 2019/0246565 A1 Aug. 15, 2019

Related U.S. Application Data

(63) Continuation of application No. 15/485,448, filed on Apr. 12, 2017, now Pat. No. 10,271,479.

(51) Int. Cl.
| B65G 47/76 | (2006.01) |
| A01D 90/02 | (2006.01) |
| A01D 90/10 | (2006.01) |
| B60P 1/38 | (2006.01) |
| B65G 67/08 | (2006.01) |

(52) U.S. Cl.
CPC .......... *A01D 90/02* (2013.01); *A01D 90/10* (2013.01); *B60P 1/38* (2013.01); *B65G 47/766* (2013.01); *B65G 67/08* (2013.01); *B65G 2814/0301* (2013.01)

(58) Field of Classification Search
CPC ......... B65G 47/61; B65G 47/766; B65G 4/76
USPC ................................ 414/528, 503, 505, 523
See application file for complete search history.

(56) References Cited

U.S. PATENT DOCUMENTS

| 1,818,427 | A | * | 8/1931 | Paisley | ................ | B65G 47/766 |
| | | | | | | 198/364 |
| 2,655,274 | A | | 10/1953 | Lowe | | |
| 3,037,780 | A | | 6/1962 | Skromme | | |
| 3,047,173 | A | | 7/1962 | Raney | | |
| 3,189,202 | A | | 6/1965 | Hansen | | |
| 3,629,890 | A | | 12/1971 | Harris | | |

(Continued)

FOREIGN PATENT DOCUMENTS

| DE | 102008053325 | 4/2010 |
| DE | 102009035038 | 4/2010 |

(Continued)

OTHER PUBLICATIONS http://www.spudnik.us/products/4835.php; The New Crop Cart from Spudnik; May 6, 2015.

(Continued)

*Primary Examiner* — Saul Rodriguez
*Assistant Examiner* — Willie Berry, Jr.
(74) *Attorney, Agent, or Firm* — Neustel Law Offices

(57) ABSTRACT

A crop cart loading system for loading a crop. The crop cart loading system generally includes a hopper having a floor and a sidewall extending from the floor to an upper edge thereof. The sidewall defines a first end, a second end opposite the first end, and an interior space for accommodating a crop. A conveyor is mounted to the hopper and configured to receive a crop at one of the first and second ends, and to longitudinally translate the crop above the floor toward the other of the first and second ends.

19 Claims, 15 Drawing Sheets

(56) References Cited

U.S. PATENT DOCUMENTS

| | | | |
|---|---|---|---|
| 4,494,904 A | | 1/1985 | Hill |
| 4,630,988 A | * | 12/1986 | LaRue ................... B65G 65/42 198/525 |
| 5,013,207 A | | 5/1991 | Baker |
| 5,364,221 A | | 11/1994 | Theurer |
| 7,540,700 B2 | | 6/2009 | Hook |
| 7,988,403 B2 | | 8/2011 | Ricketts |
| 2002/0122713 A1 | | 9/2002 | Muller |
| 2011/0232228 A1 | | 9/2011 | Iwasa |
| 2011/0318151 A1 | * | 12/2011 | Sheehan ................... B60P 1/36 414/523 |
| 2016/0129823 A1 | | 5/2016 | Millsaps, II |
| 2016/0286727 A1 | | 10/2016 | Telkamp |

FOREIGN PATENT DOCUMENTS

| | | |
|---|---|---|
| DE | 202013102388 | 8/2013 |
| WO | WO 2016/087860 | 6/2016 |

OTHER PUBLICATIONS http://www.hsrowcrop.com/archived/pdf/sugarbee2-lowres.pdf; Sugarbeet Cart Brochure from H&S Manufacturing; May 6, 2015.
http://hydraulicdumpcart.com/; High Dump Cart from HighDumpCart.com; May 12, 2015.
http://www.oxbocorp.com/Products/DumpCarts.aspx; Dump Carts from Oxbo International Corporation; May 12, 2015.
You Tube Video Screenshots of Holmer Harvester; Oct. 22, 2015.
http://harriston-mayo.com/mayo/products/evenflows/evenflow/pdfs/evenflow-product-brochure.pdf; Mayo Evenflow Product Brochure; Jan. 1, 2016.
http://harriston-mayo.com/mayo/evenflows.php; Harriston Mayo Evenflows Product Website; Jan. 1, 2017.
Pictures of Rear Loading Conveyor from Inventor; Apr. 25, 2017.

* cited by examiner

CROP CART LOADING SYSTEM

CROSS REFERENCE TO RELATED APPLICATIONS

The present application is a continuation of U.S. application Ser. No. 15/485,448 filed on Apr. 12, 2017 which issues as U.S. Pat. No. 10,271,479 on Apr. 30, 2019. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field of the Invention

The present disclosure relates generally to a crop cart, and more specifically, to a crop cart loading system for more efficiently loading a crop into a crop cart.

Description of the Related Art

Any discussion of the related art throughout the specification should in no way be considered as an admission that such related art is widely known or forms part of common general knowledge in the field.

Crop carts are used to receive a crop from a harvester directly in the field during harvest. Crop carts can also be used to transport seed to a planter. Crop carts are typically used to receive, transport and unload various types of field crops such as, but not limited to, sugar beets, carrots, potatoes, onions, tomatoes, cucumbers, corn silage and the like. Conventional crop carts are comprised of a trailer that is pulled by a tractor through the field next to the harvester. Conventional crop carts include an open topped hopper that receives various volumes of harvested crop from the harvester in real-time. When the hopper of the crop shuttle is full, the crop cart is transported to a location in the field to unload to a truck or other transport device using an unloading conveyor at the front of the hopper. The hopper includes a floor conveyor that moves the crop forward toward the unloading conveyor where the unloading conveyor is angled upward to lift the crop upward from the crop shuttle into the transport vehicle.

Crop carts are also used for transporting seeds for planting. During such use, efficiently loading the crop cart can be difficult given both the need to protect the integrity of the seeds and the desire for efficient and thorough loading of the hopper of the crop cart. As such, there is a need in the art for new and improved crop cart loading and unloading systems which load, unload, and transport harvested crops and/or seeds to and from a crop cart.

SUMMARY

The inventive disclosure is directed to a crop cart system for loading a crop. The system includes a crop cart having a hopper and a conveyor mounted to the hopper. The hopper has a floor and a sidewall extending from the floor to an upper edge thereof. The sidewall defines a first end, a second end opposite the first end, and an interior space for accommodating a crop. The conveyor is mounted to the hopper, and is configured to receive a crop at one of the first and second ends, and to longitudinally translate the crop above the floor toward the other of the first and second ends.

There has thus been outlined, rather broadly, some of the embodiments of the crop cart loading system in order that the detailed description thereof may be better understood, and in order that the present contribution to the art may be better appreciated. There are additional embodiments of the crop cart loading system that will be described hereinafter and that will form the subject matter of the claims appended hereto. In this respect, before explaining at least one embodiment of the crop cart loading system in detail, it is to be understood that the crop cart loading system is not limited in its application to the details of construction or to the arrangements of the components set forth in the following description or illustrated in the drawings. The crop cart loading system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
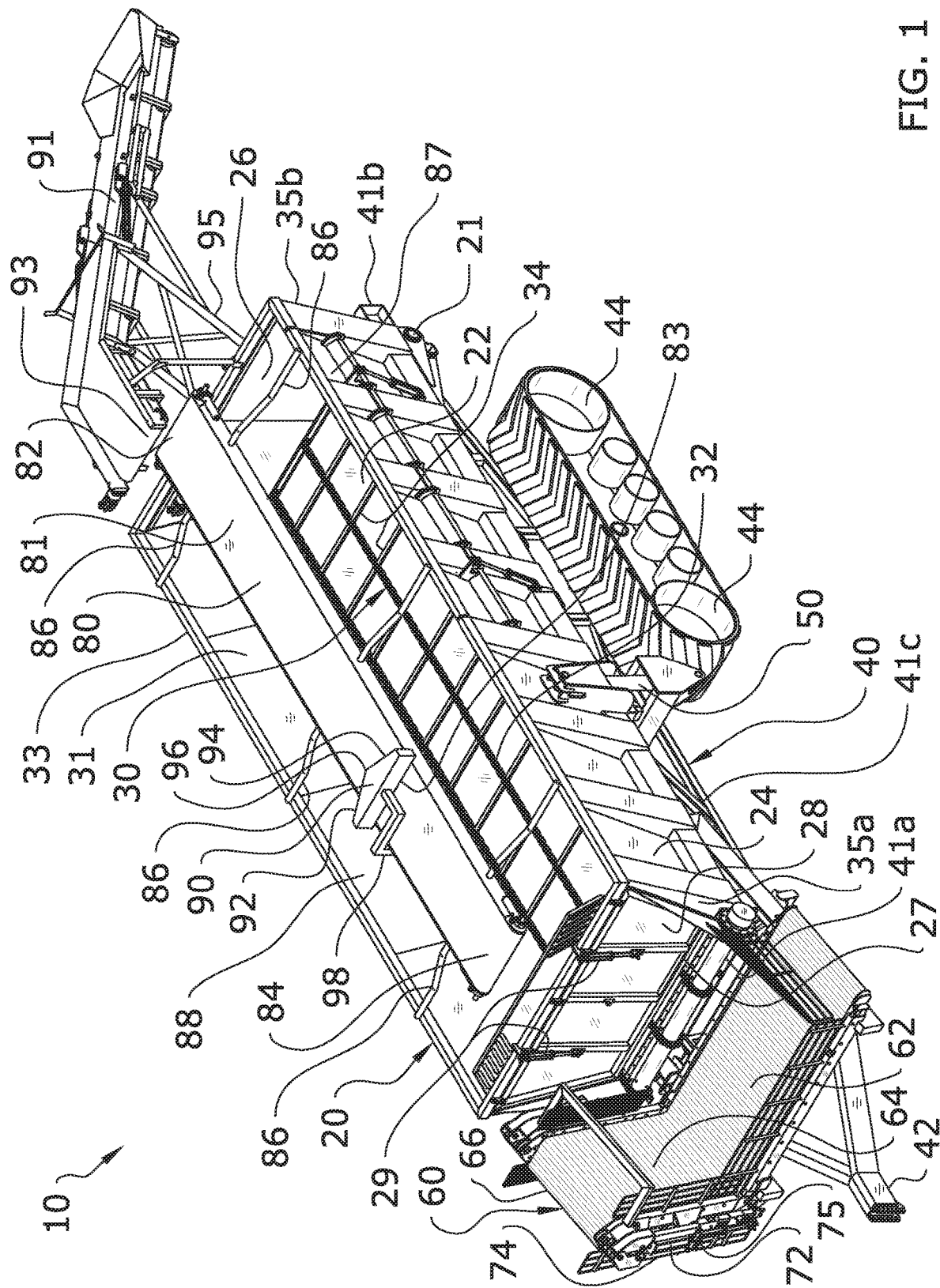
FIG. 1 is a front upper perspective view of an exemplary embodiment of a crop cart in accordance with the present disclosure.

A. Overview.

Turning now descriptively to the drawings, in which similar reference characters denote similar elements throughout the several views, FIGS. 1 through 8d illustrate a crop cart system 10 which includes a hopper 20 having a lower floor 22, a rear door 26, and an unloading end 27 operatively associated with, respectively, a floor conveyor 30, an elevated conveyor 80, and an unloading conveyor 60. The system 10 can efficiently load and unload a field crop 14 into and out of a crop cart.

The hopper 20 includes a sidewall 24 extending upward from the lower floor 22, an unloading door 28 movably connected to the unloading end 27, and an upper opening 31 defined by an upper edge 33 of the sidewall 24 for receiving the field crop 14 (FIGS. 5b-5d and 8b-8d). The hopper 20 can be pivotally connected to a support frame 40 having a plurality of wheels 44 or a track system. At least one actuator 50, 52 preferably connects the support frame 40 and the hopper 20 to lift the unloading end 27 of the hopper 20.

The crop cart system 10 is capable of being pulled from behind a vehicle similar to a trailer, or may have its own engine, as power assist or to operate as its own vehicle, similar to a truck. The crop cart system 10 is designed for receiving, transporting and unloading various types of field crops 14 such as, but not limited to, sugar beets, carrots, potatoes, onions, tomatoes, cucumbers, corn silage and the like. The crop cart system 10 may be utilized to receive, transport and unload various types of crop seed, and may also be utilized for transporting and receiving non-field crops such as lime. In the description and claims of this application, the term "crop" shall refer to any form of harvested crop, field and non-field crops, and crop seeds for planting.

B. Support Frame.

The support frame 40 has a front end 41a, a rear end 41b, a left side 41c, a right side 41d, and a longitudinal axis 43 (FIG. 5a) extending from the rear end 41b to the front end 41a. The support frame 40 may have various shapes and structures capable of supporting the hopper 20. By way of example, the support frame 40 can include a plurality of wheels 44 rotatably attached to the sides of the support frame 40 for movably supporting the support frame 40 above a ground surface. A first track 46 preferably surrounds a plurality of wheels 44 on a first side of the support frame 40, and a second track 46 preferably surrounds a plurality of wheels 44 on a second side of the support frame 40 as illustrated in FIGS. 1 through 8d of the drawings. The support frame 40 can additionally include a hitch 42 adapted for removably connecting to a vehicle such as a tractor. The support frame 40 may be comprised of any type of frame structure capable of supporting the hopper 20 in a movable manner in a field.

C. Hopper

The hopper 20 has a sidewall 24 extending upward from the lower floor 22 to an upper edge 33 thereof, and defines a first end 35a, a second end 35b opposite the first end 35a, and an interior space 31 for receiving and accommodating the crop 14 as best illustrated in FIGS. 5b to 5d and FIGS. 8b to 8d. The hopper 20 preferably has an elongated rectangular shape structure with a longitudinal axis that extends parallel to the longitudinal axis 43 of the frame from a rear end to a front end of the hopper 20. The length and width of the hopper 20 are also preferably similar to the length and width of the support frame 40.

The hopper 20 is configured to receive the field crop 14 from, for example, a harvester as the crop cart system 10 is pulled alongside the harvester in the field. The unloading door 28 movably connected to the unloading end of the hopper 20 allows for selective unloading of the field crop 14. One or more unloading actuators 29 are connected to the sidewall 24 of the hopper 20 and the unloading door 28 to move the unloading door 28 into a closed position or an open position. The unloading actuators 29 are preferably hydraulic actuators controlled by the tractor, however, the unloading actuators 29 may be electro-mechanical actuators. The unloading door 28 is preferably pivotally attached at an upper end thereof to or near the upper edge 33 of the sidewall 24. The unloading door 28 is preferably positioned at the front end of the hopper 20, but may alternatively be positioned at the rear end thereof.

The floor conveyor 30 is movably positioned relative to the lower floor 22 and moves the field crop 14 within the hopper 20. A drive motor moves the floor conveyor 30 such that the upper run thereof adjacent the upper surface of the floor 22 moves the field crop 14 in a first direction toward an opening exposed by the unloading door 28 when the unloading door 28 is in an open position. The drive motor is preferably comprised of a hydraulic motor that is fluidly connected to the tractor pulling the crop cart system 10, and the speed of the floor conveyor 30 can be adjustably controlled from the tractor. It will be appreciated that a faster moving floor conveyor 30 will result in an increase in the volume of crop 14 discharged to the unloading conveyor 60, and vice versa.

The floor conveyor 30 additionally includes a lower run that extends beneath the lower floor 22 and moves in a second direction opposite the first direction and away from the opening exposed by the unloading door 28. The floor conveyor 30 is preferably comprised of a bar-type conveyor having a plurality of cross members 34 (with or without one piece rubber or flapped attachments) attached to chains 32 that extend transverse to a movement path of the floor conveyor 30. However, the floor conveyor 30 may be comprised of various other types of conveyors.

In certain embodiments, the hopper 20 is pivotally connected to the support frame 40 to allow the unloading end 27 to be lifted upward to an unloading position and lowered downward to a loading position. The hopper 20 can be pivotally connected near the front end or the rear end of the support frame 40. However, it is preferable that the hopper 20 is pivotally connected to the support frame 40 at or near the rear end of the support frame 40 with the unloading end 27 of the hopper 20 located in the front. The unloading end 27 of the hopper 20 is preferably near the front end of the support frame 40. The hopper 20 is pivotally connected to the support frame 40 by one or more hinges 21 connected to or near the rear end of the support frame 40 and to the rear portion of the hopper 20.

The lower floor 22 of the hopper 20 is preferably substantially horizontal when the hopper 20 is in the loading position. The lower floor 22 is preferably comprised of a flat and level planar structure to allow the floor conveyor 30 to move along the upper surface of the lower floor 22. The lower floor 22 of the hopper 20 is angled upwardly, preferably between 10 and 15 degrees towards the unloading end 27 when the hopper 20 is in the unloading position. When the unloading end 27 of the hopper 20 is at the front end, the lower floor 22 of the hopper 20 is angled upwardly, again at 10 to 15 degrees from the rear end of the hopper 20 to the front end of the hopper 20.

The hopper 20 may also include a second door opposite the unloading door 28. However, if the unloading door 28 is located in the rear portion of the hopper 20, then the second door would be located at the front portion of the hopper 20. The rear door 26 may be used to unload a field crop 14 or other particulate material from the hopper 20 opposite the unloading conveyor 60 by simply lifting the front end of the hopper 20 without moving the floor conveyor 30.

The unloading conveyor 60 is comprised of a first segment 62 attached to the unloading end 27 of the hopper 20, a second segment 64 pivotally connected to a distal end of the first segment 62, and a third segment 66 pivotally connected to a distal end of the second segment 64. The first segment 62 has a first frame, the second segment 64 has a second frame, and the third segment 66 has a third frame. The frame segments 62, 64, 66 are independently movable with respect to one another in a pivotal manner. The first frame of the first segment 62 is preferably non-movably attached to the front end of the hopper 20 such that the upper surface of the unloading conveyor 60 is at or below the upper surface of the lower floor 22 of the hopper 20 to receive the field crop 14.

D. Elevated Conveyor

The elevated conveyor 80 of the crop cart system 10 is mounted to an upper portion 88 of the sidewall 24 of the hopper 20 by support members 86 which connects to opposite sides of the conveyor 80. The support members 86 can be brackets or other suitable mounting structures, but are preferably structures which will not interfere with longitudinal translation of the stopper 90, or with guided movement of the crop 14 off of the conveyor 80 and into the interior space 31 of the hopper 20 as further discussed below. The brackets 86 can be attached, for example, to the upper edge 33 of the sidewall 24, and may be configured to attach and detach the conveyor 80 from hopper 20 of the crop cart system 10 so that the crop cart can be used with or without the conveyor 80 and stopper 90 depending on the season and application desired.

Figure 7:
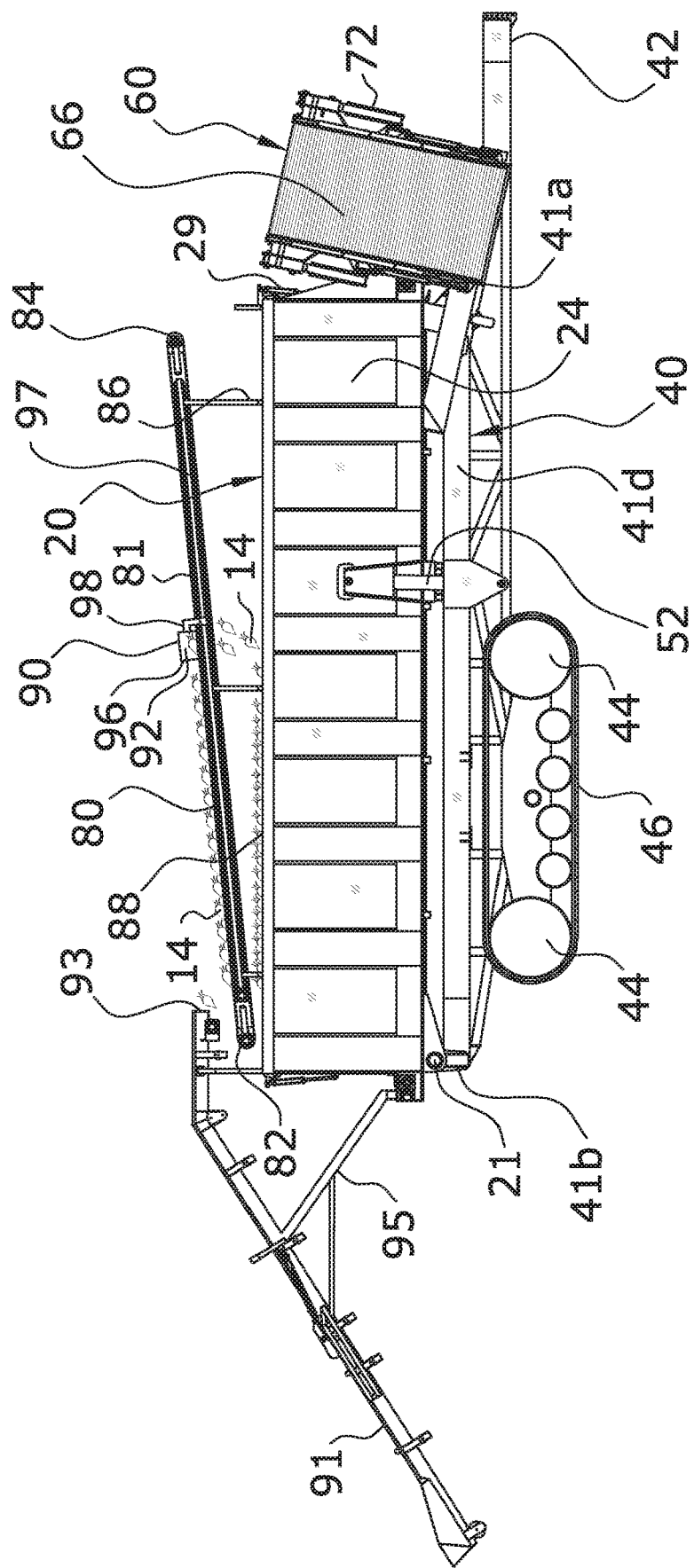
FIG. 7 is a front view of an additional alternative embodiment of a crop cart in accordance with the present disclosure.

The elevated conveyor 80 is configured to receive a crop 14 at one of the first and second ends 82, 84 thereof, and to longitudinally translate the crop 14 along the upper portion 88 of the sidewall 24 (e.g., above or below the upper edge 33 of the sidewall 24, but offset from the floor 22 of the hopper 20) toward the other of the first and second ends 82, 84. In the embodiments of FIGS. 1-7, the crop 14 is received by the elevated conveyor 80 at the first end 82, with the first end 82 operatively disposed vertically underneath and aligned with the output end 93 of a supply conveyor 91. The crop 14 can be longitudinally translated across the upper portion 88 of the hopper 20 toward the second end 84 of the conveyor 80 without any elevation or downward movement relative to the floor 22. However, as shown in FIG. 7, in certain embodiments, the conveyor 80 can be inclined relative to the upper edge 33 of the sidewall 24 (which may be substantially level or inclined relative to the ground) such that the crop 14 is elevated by the conveyor 80 relative to the hopper 20 as it is longitudinally translated along the upper portion 88. Such incline of the conveyor 80 allows more crop 14 to fit in the hopper 20. In other embodiments, the conveyor 80 may include sections which lower the crop 14 and/or adjust in height or orientation.

The conveyor 80 preferably extends substantially the entire length of the floor 22 such that the ends 82, 84 thereof are disposed at or adjacent the respective first and second ends 35a, 35b of the sidewall 24. In this manner, the crop 14 can be translated across the entire longitudinal length of the hopper 20 in an elevated position, and deposited in a more controlled and evenly distributive manner (both longitudinally and transversely) throughout the hopper 20. It will be appreciated that elevated conveyors which are shorter in length, or multiple elevated conveyors coupled to one another, may be utilized in accordance with various embodiments of the present disclosure. The conveyor 80 is preferably centrally located about the longitudinal axis of the hopper 20, and may be positioned entirely above, along, or below the upper edge 33 of the sidewall 24.

Similar to the floor conveyor 30, the elevated conveyor 80 can be driven by a drive motor such that the upper run thereof moves the field crop 14 in a longitudinal direction. The drive motor can include a hydraulic motor fluidly coupled by a transport vehicle coupling to the ends thereof. It will be appreciated that a faster moving elevated conveyor 80 will increase the flow rate of crop 14 loaded into the hopper 20.

The elevated conveyor 80 additionally includes a lower run that extends below the upper run 81, but is preferably always above the level of crop 14 loaded into the hopper 20, and moves in a second longitudinal direction opposite the first direction of travel of the crop 14. The elevated conveyor 80 can be a bar-type conveyor having a plurality of cross members 89 (FIG. 5b), with or without one piece rubber or flapped attachments such as those attached to chains 32, that extend transverse to a movement path of the elevated conveyor 80. As described above with respect to the floor conveyor 30, the elevated conveyor can include various other types of conveyors.

E. Stopper

The crop cart system 10 includes a stopper 90 mounted above the conveyor 80. The stopper 90 is configured to stop longitudinal translation of the crop 14 on the conveyor 80 at a predetermined longitudinal position, and to guide the crop 14 into the hopper 20, preferably on opposite sides of the conveyor 80. The stopper 90 is mounted with a bracket structure 98 or other suitable mounting structure to the conveyor 80 or upper edge 33 of the sidewall 24. The stopper 90 can be fixed in place by the bracket structure 98 with a bottom surface of the stopper 90 positioned flush with the upper run 81 of the conveyor 80. It will be appreciated that in order to avoid damage to the stopper 90 or upper run 81 of the conveyor 80, the stopper 90 should not be positioned to contact the conveyor 80 too tightly. The stopper 90 is preferably positioned close enough to the conveyor 80 to stop the crop 14 from passing underneath it or becoming jammed in any gap therebetween. Rollers 11 (e.g., two small wheel rollers with bearings that push the stopper 90 just off of the upper run 81 of the conveyor 80) may be utilized on the bottom surface of the stopper 90 to prevent excess friction between the stopper 90 and the conveyor 80 (FIG. 2) should contact between the two be desired depending on the general size of the crop 14 being loaded. In various embodiments, soft materials may be utilized for the stopper 90 to reduce stress on the crop 14 as it impacts the stopper 90. By way of example, the stopper 90 may be constructed from a steel backer frame with UHMW (Ultra-high-molecular-weight polyethylene) portions bolted to the front surfaces 92, 94 thereof.

As shown in FIGS. 1-2, 5a-5d, and 6-8d, the stopper 90 is substantially the same width as the conveyor 80, and can be wedge-shaped, symmetric, and configured to substantially equalize flow of the crop 14 into the hopper 20 on opposite sides thereof. This division of the flow of crop 14 is accomplished by the first and second front surfaces 92, 94 of the stopper 90, as well as the front center point 96, which together split the flow of crop 14 and direct it in opposed transverse directions, off of the conveyor 80, and into the hopper 20. The front center point 96 is preferably centrally located in the stopper 90 such that it aligns with the central longitudinal axis of the conveyor 80 when the stopper 90 is aligned widthwise with the conveyor 80. While the stopper 90 is illustrated as wedge-shaped, the straight surfaces 92, 94 can alternatively be curved or rounded, and various other shapes and configurations of the stopper 90 can be utilized to split and divert crop 14 from the conveyor 80 into the hopper 20.

Figure 9:
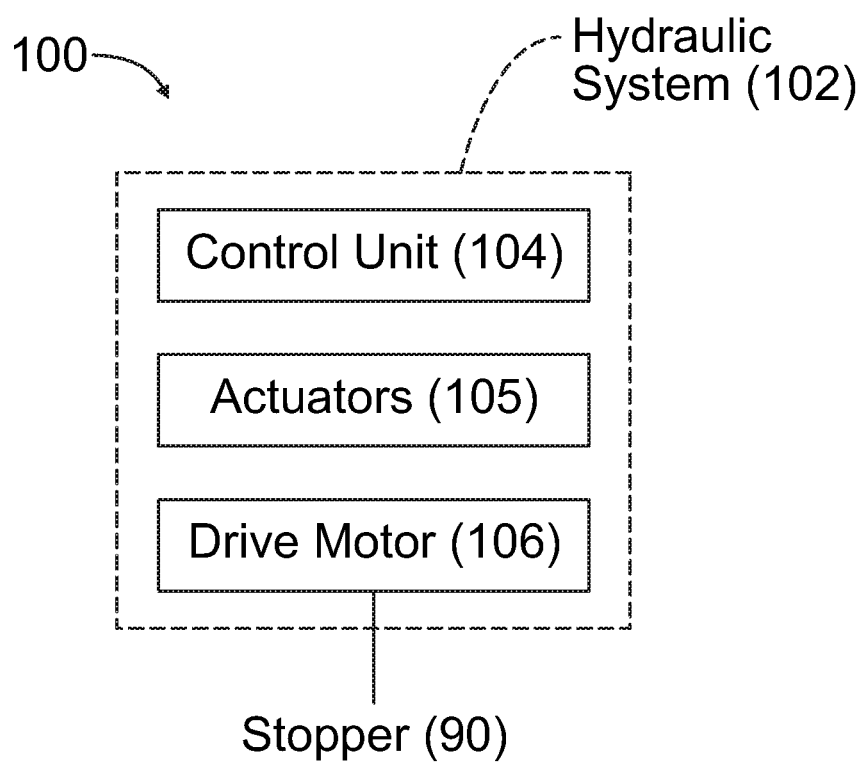
FIG. 9 is a schematic diagram of a control system for controlling the longitudinal position of the stopper on the elevated conveyor of the present disclosure.

The stopper 90 is preferably detachably mounted to the conveyor 80 and longitudinally translatable relative thereto so that it can be placed at predetermined longitudinal positions along the conveyor 80. Such detachable mounting may be accomplished by, for example, moving the mounting bracket structure 98 along an elongated member 97 (FIG. 2) which is mounted to the conveyor 80 and extends parallel thereto. The mounting bracket structure 98 and stopper 90 may be translated to a desired longitudinal position on the elongated member 97 (corresponding to a desired longitudinal position of the stopper 90 on the conveyor 80) by using, for example, the control system 100 of FIG. 9. As shown in FIG. 9, the control system 100 includes a hydraulic system 102 with a control unit 104 operatively associated with a drive motor 106 (e.g., an orbital motor that converts hydraulic energy into mechanical energy). The control unit 104 can include a user operated lever which allows for manual actuation of hydraulic actuators 105 connected to the drive motor 106 for moving the stopper 90 longitudinally toward the first and second ends 82, 84 of the conveyor 80.

Figure 2:
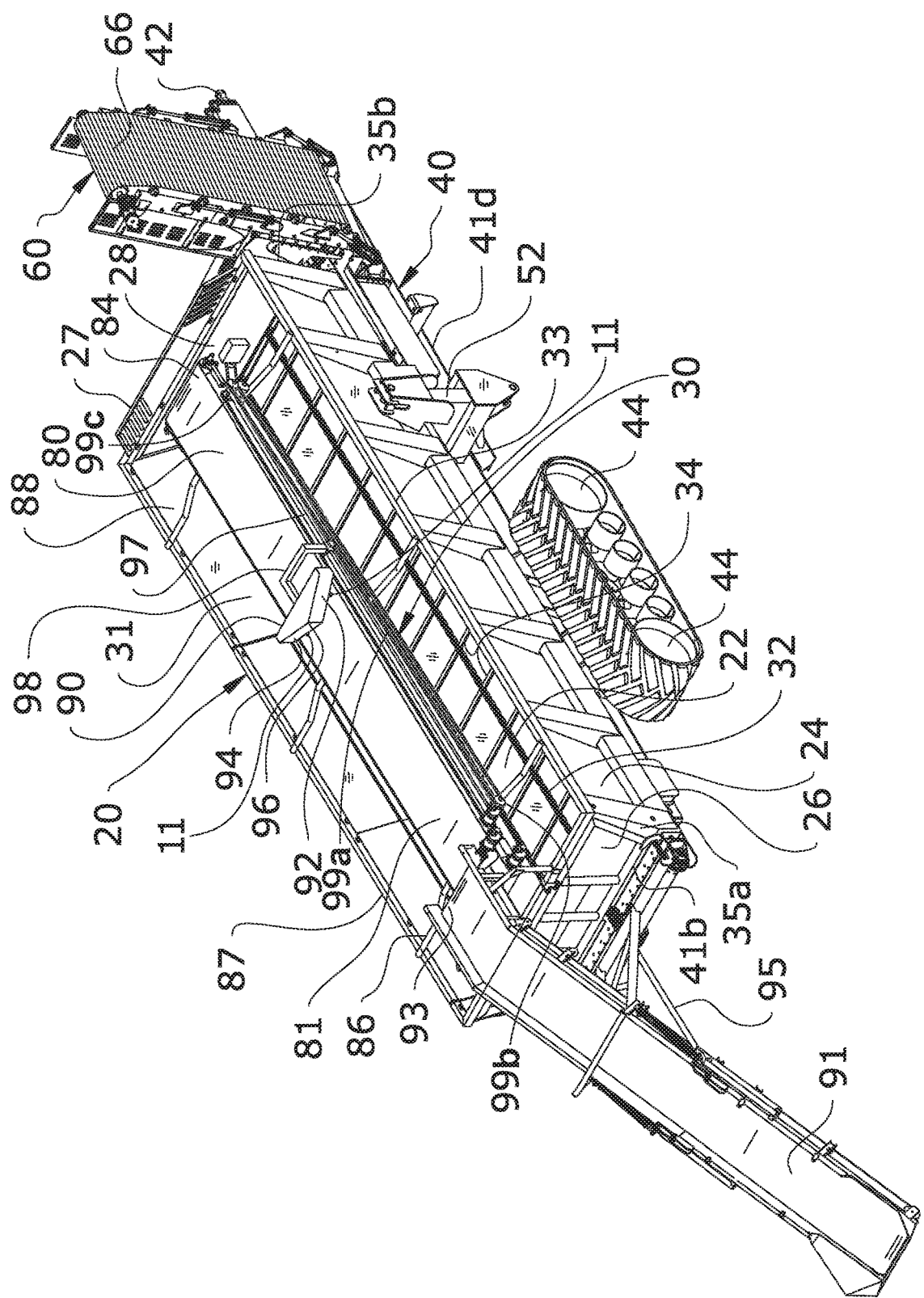
FIG. 2 is a rear upper perspective view of the crop cart of FIG. 1, and shows an exemplary drive mechanism for moving the stopper in accordance with the present disclosure.
Figure 3:
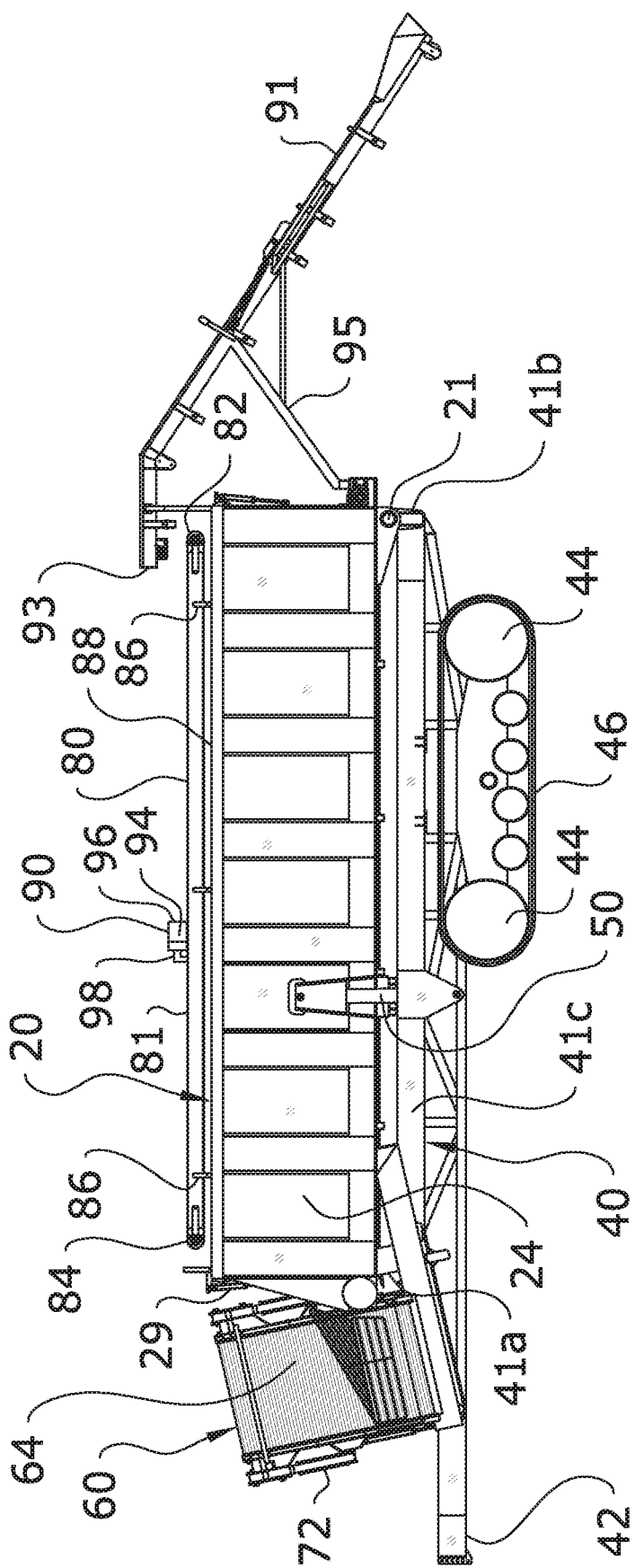
FIG. 3 is a right side view of the crop cart of FIG. 1.
Figure 4:
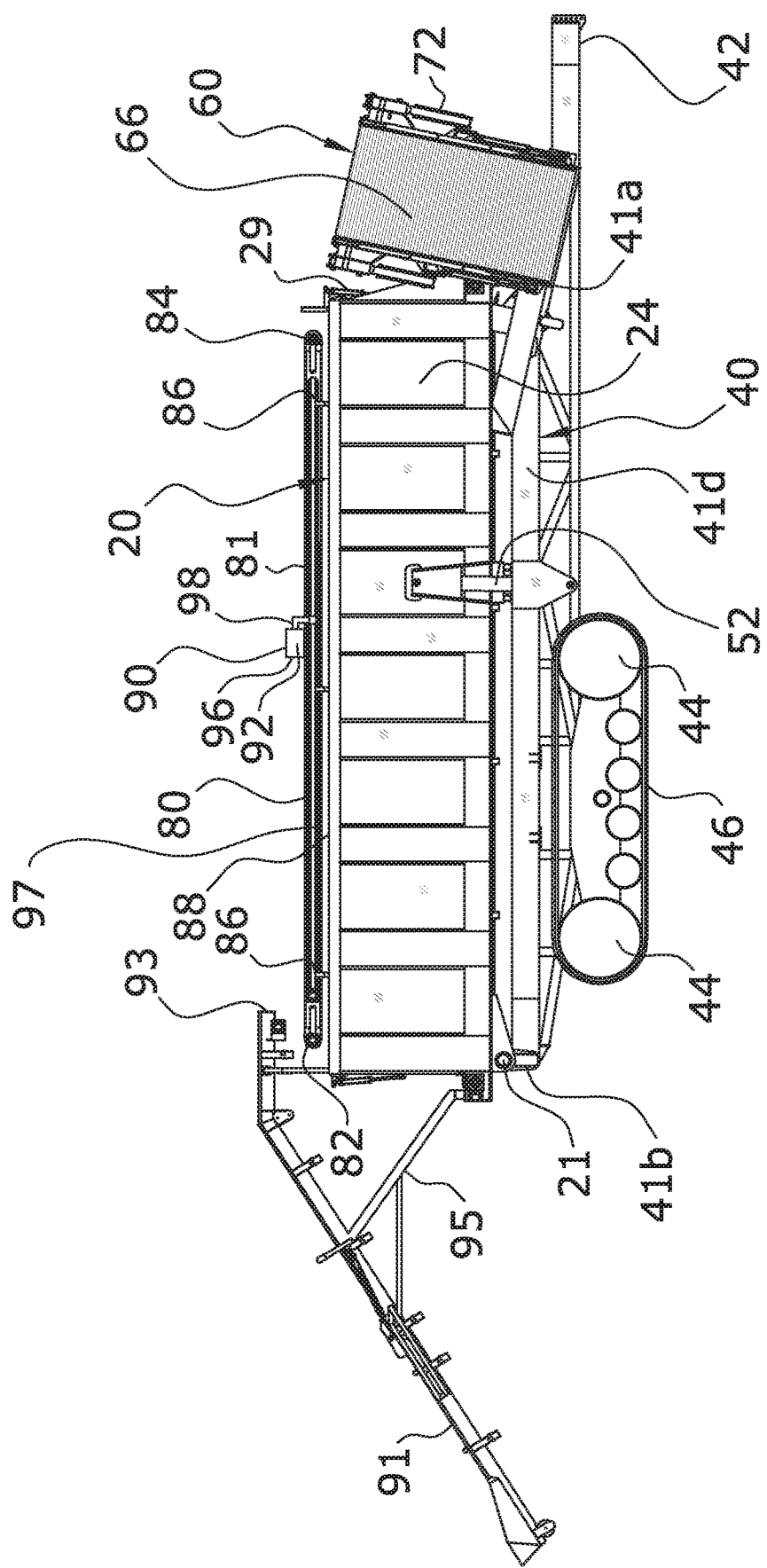
FIG. 4 is a left side view of the crop cart of FIG. 1.

As shown in FIG. 2, the stopper 90 can be mechanically coupled to a chain 99a or cable (not shown) operatively associated with the drive motor of the control system 100. The chain 99a or cable is preferably an endless loop but may be comprised of a non-endless loop structure. A non-flexible structure may alternatively be used instead of the chain 99a or cable also. The chain 99a runs along the elongated member 97 and is looped over pulleys, sprockets or gears 99b, 99c. The bottom of the bracket structure 98 cups the elongated member 97 and is coupled to the chain 99a. In this manner, a user can simply pull and push a lever of the control system 100 to selectively diverge the feed of crop 14 at desired longitudinal locations on the conveyor 80 as further discussed below. There is no fastening involved, and the process can be done on the go, ensuring the quickest load time possible. The chain 99a, pulleys, sprockets or gears 99b, 99c, and rollers 11 are shown in FIG. 2, but have been removed from the remaining figures for ease of viewing. It will be appreciated that the control system 100 may additionally or alternatively allow for automated actuation of the hydraulic actuators and drive motor which move the stopper 90. Other suitable fastening and translational means may be utilized, but it will be appreciated that translation of the stopper 90 is preferably controlled remotely from a user platform. Such selective longitudinal placement of the stopper 90 allows for greater control over loading and more uniform distribution of crop 14, both longitudinally and transversely, across various sections of the hopper 20 without using any form of telescoping equipment, which would be expensive, time consuming, and inefficient.

The conveyor 80 and stopper 90 described above and shown in the illustrative exemplary embodiments of the figures may be used, for example, for dropping seed in the hopper 20 for later use in potato planting. In such embodiments, the hopper 20 may be loaded using the conveyor 80 after the hopper 20 has, for example, already been filled with seed 14, and then unloaded leaving a small pile of crop 14 at the front end thereof. For example, a hopper 20 may have previously been loaded by conventional means such as side loading, and then unloaded leaving a small pile of crop 14. Loading an already partially filled hopper 20 reduces the drop the seeds undergo from the conveyor 80 to the hopper 20, and thus the potential for damaging the seeds. Additionally, if a significant portion of the hopper 20 has been partially filled, then the user can easily reach gaps remaining in the hopper 20 that the seed crop 14 has not filled.

The center point 96 of the stopper 90 may also be rounded or smoothed out to reduce stress on the crop 14. It will also be appreciated that the elevated conveyor 80 can be utilized without the stopper 90. In such embodiments, the crop 14 will simply translate to and roll off the second end 84 of the conveyor 80.

F. Operation

Figure 5A:
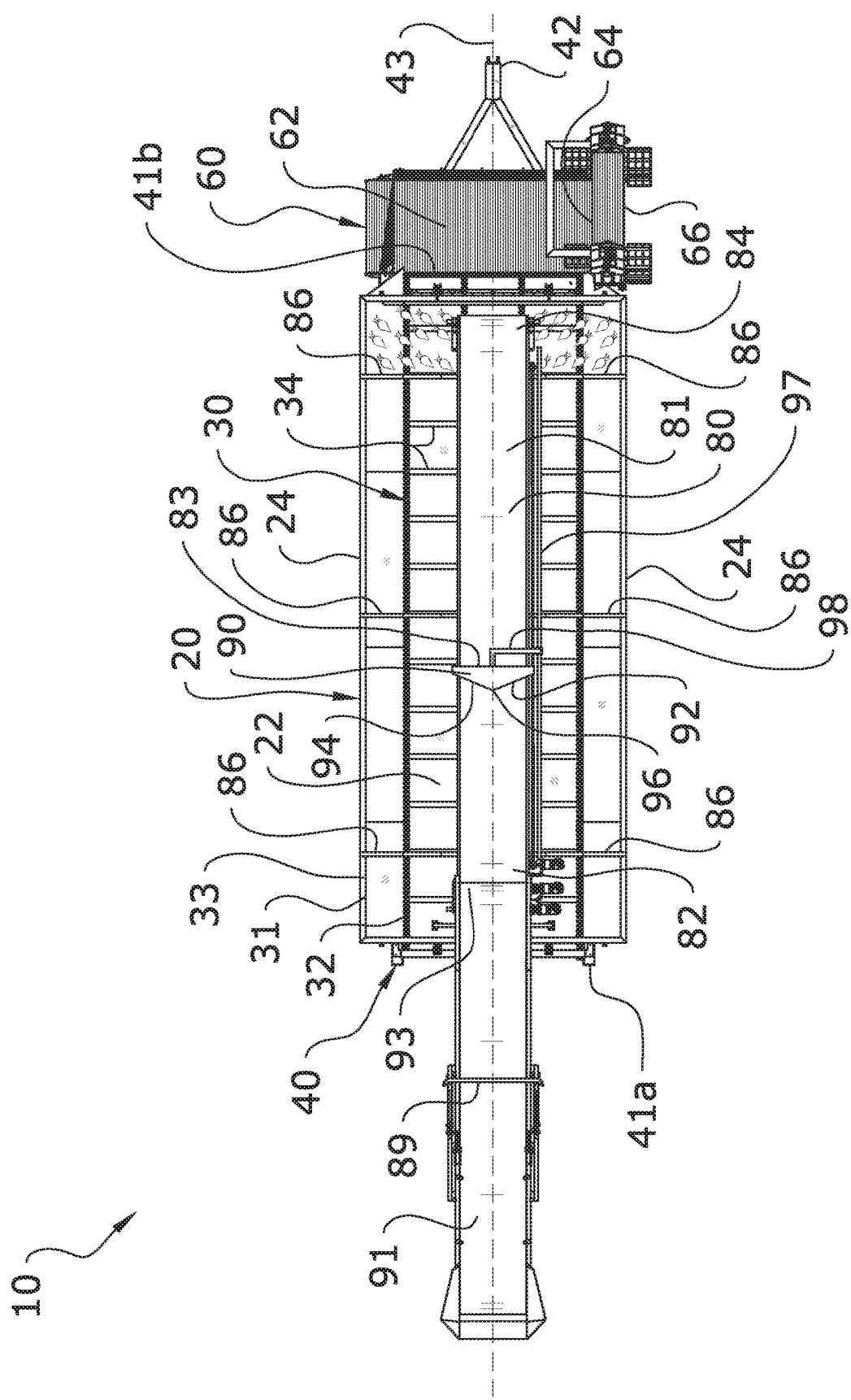
FIG. 5a is a top view of the crop cart of FIG. 1.
Figure 5B:
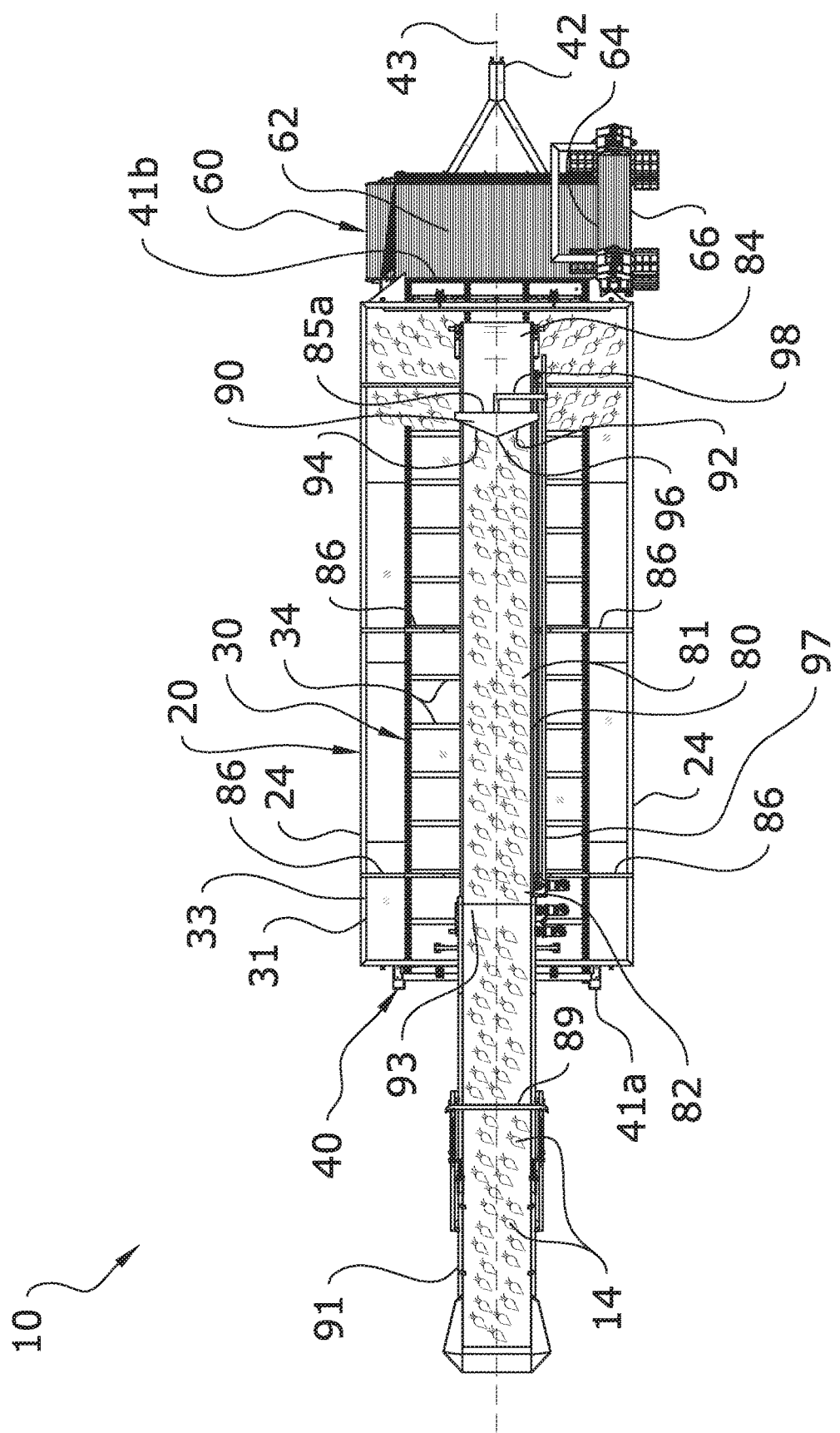
FIG. 5b is a top view of the crop cart of FIG. 1 in a first stage of front to rear loading.
Figure 5C:
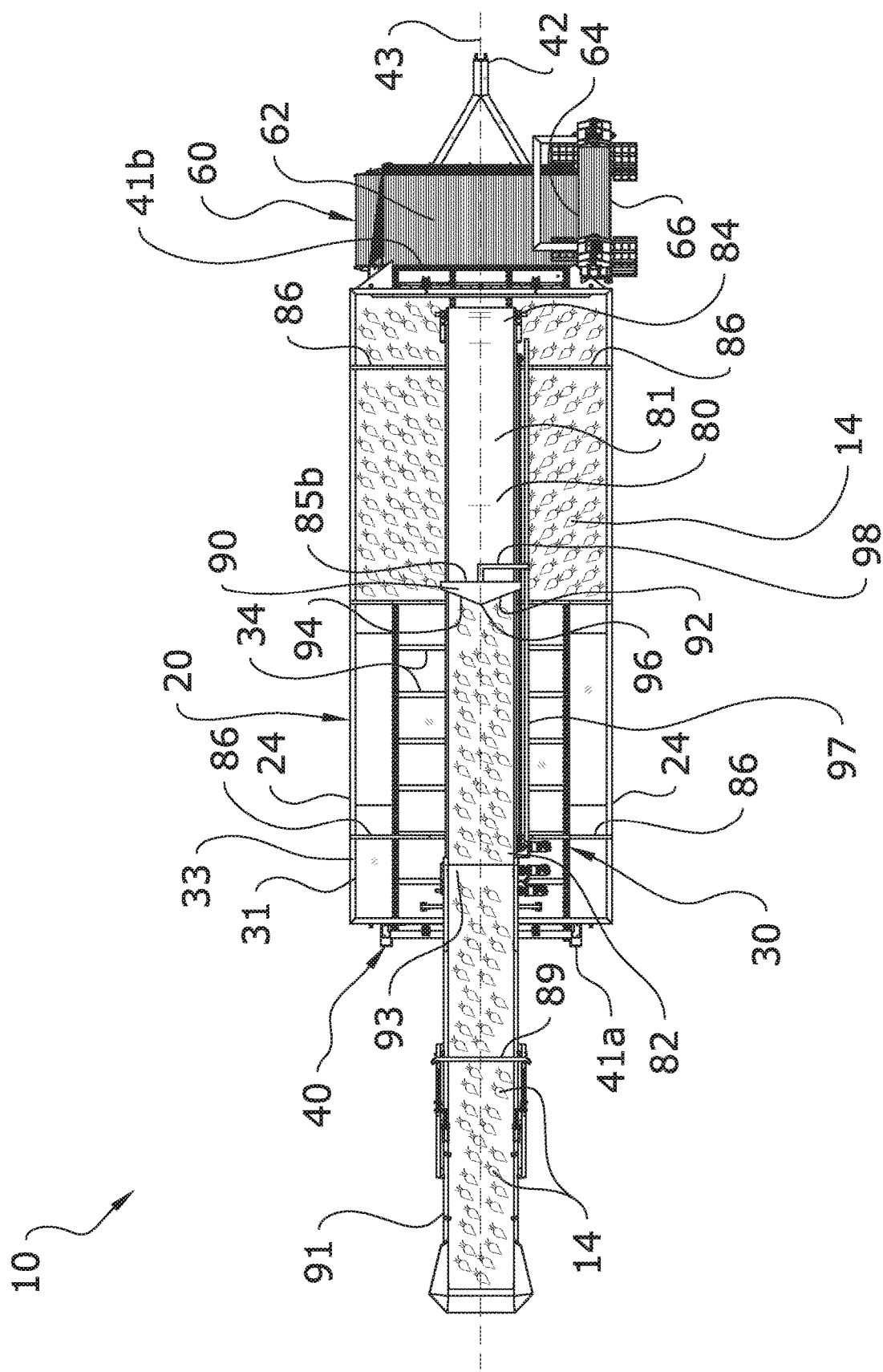
FIG. 5c is a top view of the crop cart of FIG. 1 in a second stage of front to rear loading.
Figure 5D:
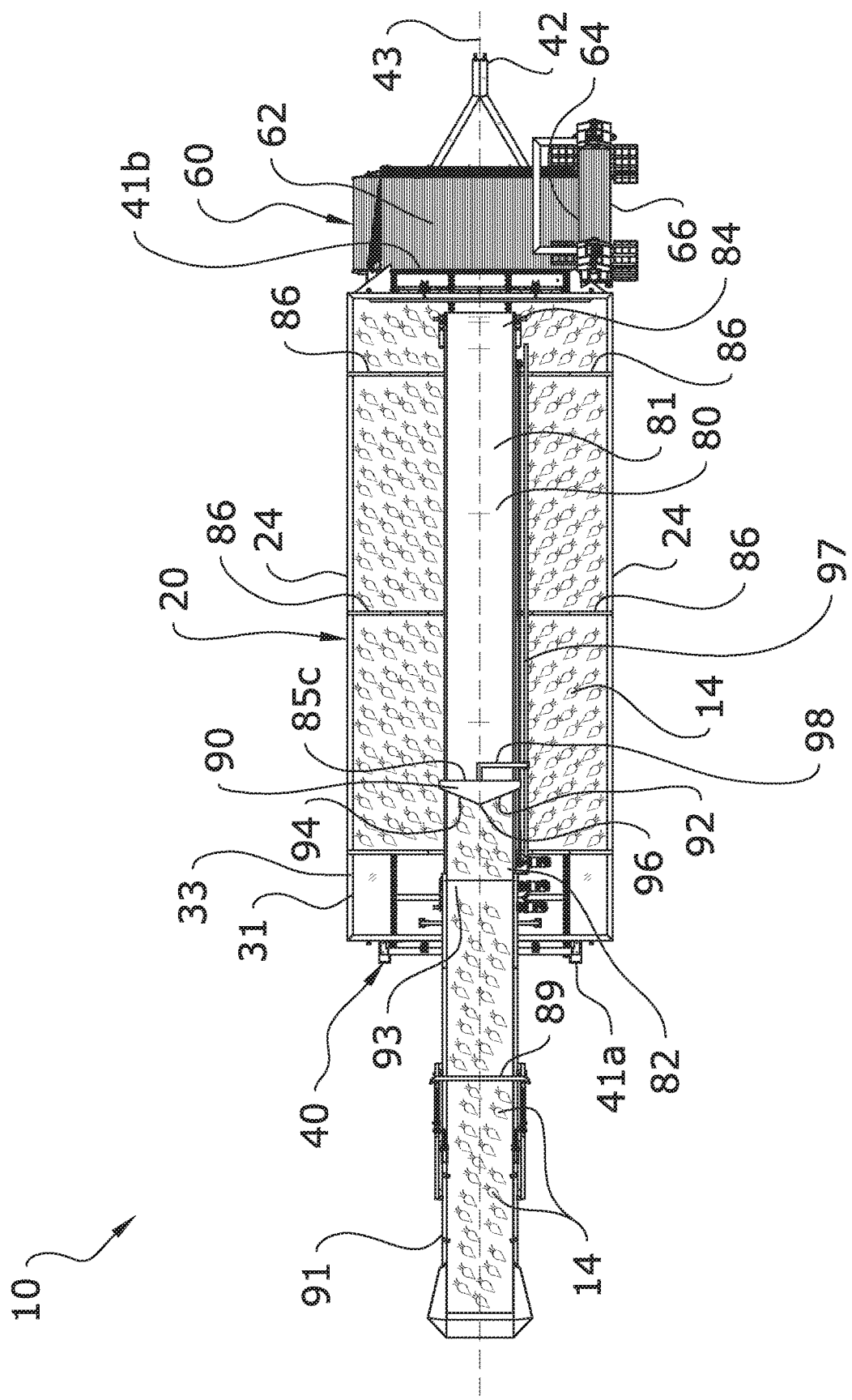
FIG. 5d is a top view of the crop cart of FIG. 1 in a third stage of front to rear loading.
Figure 6:
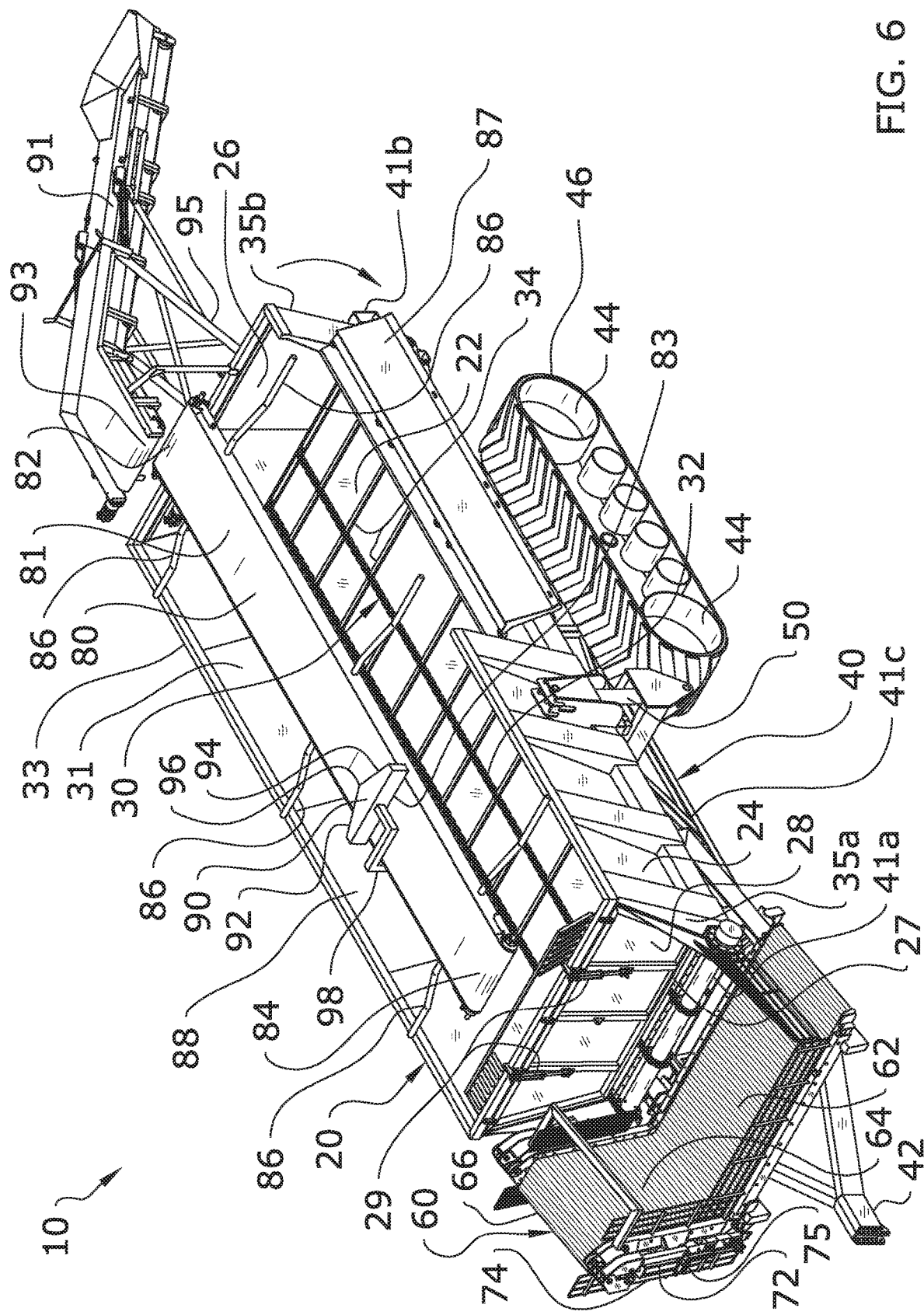
FIG. 6 is a front upper perspective view of an alternative embodiment of a crop cart in accordance with the present disclosure.

The system 10 can operate in accordance and conjunction with various embodiments, systems, and methodologies disclosed in U.S. Patent Publication No. 2016/0360704, which is hereby incorporated by reference herein in its entirety. It is also anticipated that various combinations of the loading and unloading systems and parts described herein may be utilized individually and in combination. By way of example, with reference to FIGS. 5a-5d, an exemplary loading process of a crop 14 using the elevated conveyor 80 is shown. FIG. 5a shows a configuration of the loading system (e.g., of conveyor 80 and stopper 90 of system 10) in which the hopper 20 and the conveyor 80 are configured for loading, but the stopper 90 has not yet been positioned near the second end 84 of the conveyor 80 (e.g., at the desired starting point in the embodiment of FIGS. 5a-5d), and the crop 14 has not yet been loaded onto the supply conveyor 91. Crop 14 may or may not be already be present at the front portion of the hopper 20 at this point. FIGS. 5b-5d show the introduction of new crop 14 loaded via the elevated conveyor 80, which initially adds to a small pile of crop 14 left over at the second end 84 after a prior unloading operation. As discussed, the initial small pile of crop 14 is not necessary and may exist solely because of not entirely emptying out the hopper or intentionally left in the hopper to help reduce the distance of drop for the crop or seed.

Turning now to FIG. 5b, a configuration of the loading system is shown in which the stopper 90 has been longitudinally positioned at a first longitudinal position 85a (e.g., using the control system 100 and drive mechanism discussed above with respect to FIGS. 2 and 9) at or adjacent the second end 84 of the conveyor 80, and the crop 14 is loaded into the hopper 20. The crop 14 is longitudinally translated across the output end 93 of the supply conveyor 91, dropped onto the second end 84 of the conveyor 80, and longitudinally translated across substantially the entire length of the conveyor 80 before it is guided off of the conveyor 80 by the stopper 90. It will be appreciated that as the crop 14 falls off of the end of the output end 93, a first small portion may fall directly into the hopper 20 and a second small portion may strike the conveyor 80 and then fall into the hopper 20, but a significant portion of the crop 14 will land and stay on the first end 82 of the conveyor 80, and be longitudinally transported along the upper portion 88 of the sidewall 24 to the stopper 90 at the second end 84.

As the crop 14 reaches the stopper 90, its longitudinal translation is diverted by the center point 96 and the surfaces 92, 94 of the stopper 90, which guide the crop 14 off of the conveyor 80 on opposite sides thereof. It will be appreciated that initially the crop 14 will gain downward momentum as it is guided off of the conveyor 80 in opposed transverse directions at the stopper 90 due to its height relative to the level of crop 14 below it, which may allow for a more uniform distribution across transverse sections of the hopper 20 as it lands on the existing small pile of crop 14. It will also be appreciated that increasing or decreasing the speed of the conveyor 80 will affect the degree to which the crop 14 is deflected by the stopper 90 toward the sidewall 24. The crop 14 will also backfill on the floor 22 in opposed longitudinal directions, but will principally accumulate at and adjacent the longitudinal position throughout the hopper 20 corresponding to the longitudinal position of the stopper 90 as shown.

The speed of the conveyor 80 may be varied depending on the sensitivity of the crop 14. The position of the stopper 90 in FIG. 5b may be the initial position during loading, or may be, for example, a second longitudinal position after placing the stopper 90 at a first longitudinal position even closer to the front end of the hopper 20. During loading, the floor conveyor 30 is preferably stationary, but may alternatively be operated in conjunction with the elevated conveyor 80, particularly during early loading stages to aid with uniform distribution across the hopper 20. The elevated conveyor 80 is preferably run with the floor conveyor 30 stationary to prevent product from dropping on the Boom and to the ground as the hopper 20 fills up if the Boom is running. The present system 10 enables a user to load the hopper 20 of the crop cart 14 without moving the hopper 20 at all.

FIG. 5c shows a configuration of the loading system in which the stopper 90 has been longitudinally positioned using control system 100 at about the longitudinal midpoint of the conveyor 80 (e.g., the second longitudinal position 85b) and hopper 20. After the crop 14 reaches a certain level with the stopper 90 at the longitudinal position of FIG. 5b, the conveyor 80 is stopped and the stopper 90 is moved to the longitudinal position of FIG. 5c. As shown, the crop 14 continues to fill up the hopper 20 between the first end 35a of the sidewall 24 and the middle of the hopper 20, though it will be appreciated that crop 14 will also start to back fill the floor 22 between the stopper 90 and the second end 35b.

FIG. 5d shows a configuration of the loading system in which the stopper 90 has been longitudinally positioned at a third longitudinal position 85c at or adjacent the first end 82 of the conveyor 80. The crop 14 continues to be fed on to the conveyor 80 as discussed above, longitudinally translated to the stopper 90, and is guided off of the conveyor 80 by the stopper 90.

The stopper 90 can be moved back and forth to any number of longitudinal positions along the length of the conveyor 80 during loading. When a particularly sensitive crop or seed 14 is loaded, it will be appreciated that reducing the drop between the supply conveyor 91 and the elevated conveyor 80, as well as the drop between the elevated conveyor 80 and the top level of the crop 14 in the hopper 20, will reduce damage to the crop or seed 14. Additionally, using an increasingly steep angle for the wedge of the stopper 90 to guide the crop 14 off of the conveyor 80 (e.g. such that the direction of motion of the crop 14 as it falls from the conveyor 80 will be largely longitudinal) and/or curved surfaces for the front of the stopper 90 without a center point 96 may help reduce damage to the crop 14 as it impacts the stopper 90. Since minimal drop of crop 14 is desired, a pile can be created at the rear of the crop cart (e.g., if the conveyor 80 is inclined as in FIG. 7, then the shortest distance between the conveyor 80 and the floor 22 will be at the rear of the hopper 20). Once the pile of crop 14 has been created, the lever of the control system 100 can be slowly pushed to bump the stopper 90 slowly to the front of the hopper 20 and keep the pile going. It will be appreciated that this process will create minimal drop of the crop 14 the entire way from the front to the rear of the hopper 20 until it is full.

Figure 8A:
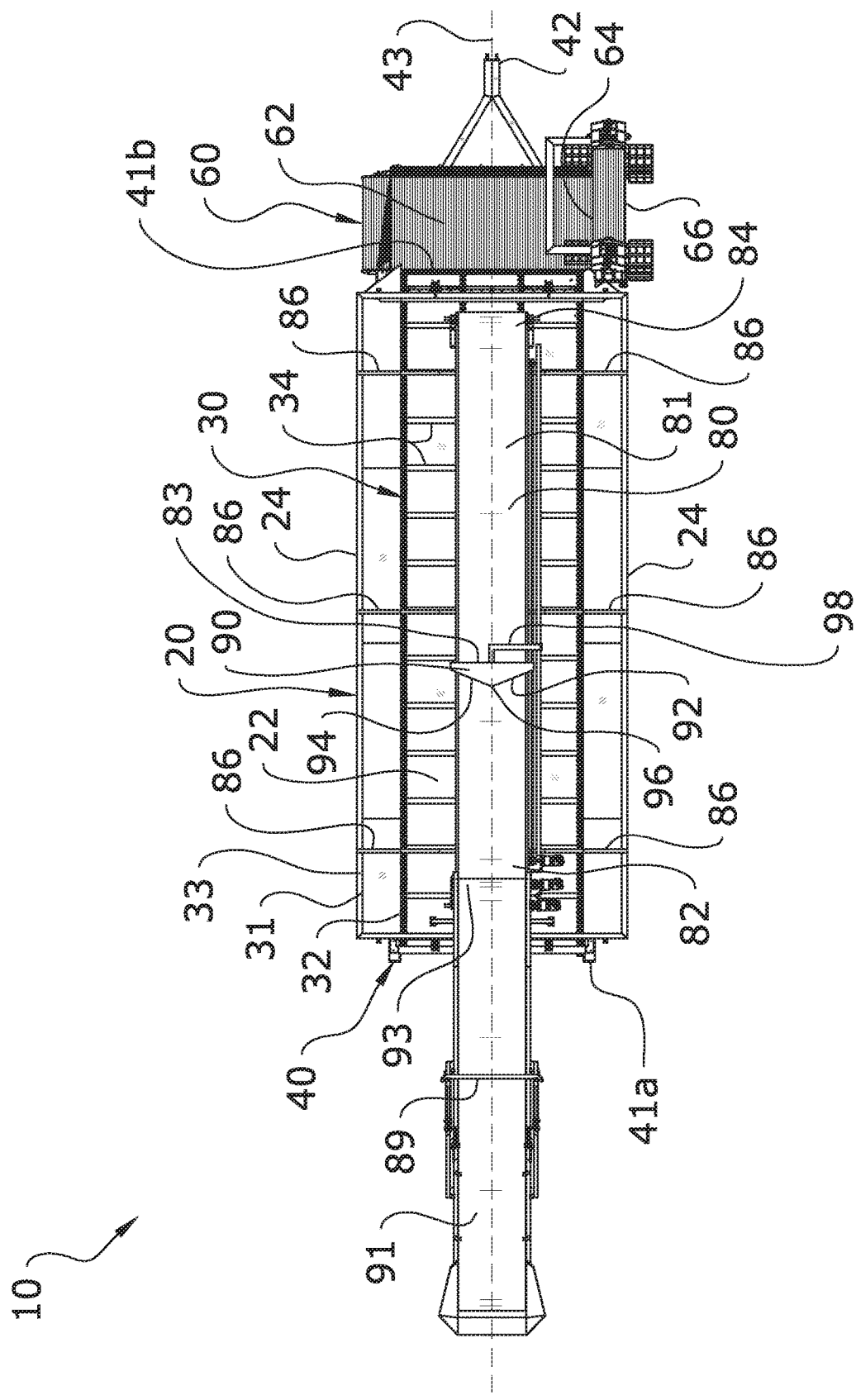
FIG. 8a is a top view of the crop cart of FIG. 1 configured for rear to front loading.

Turning now to FIGS. 8a-8d, an exemplary rear to front methodology of loading by the system 10 is shown. FIG. 8a shows a configuration of the loading system (e.g., of conveyor 80 and stopper 90 of system 10) in which the hopper 20 and the conveyor 80 are configured for loading, but the stopper 90 has not yet been positioned near the first end 82 of the conveyor 80 (e.g., at the desired starting point in the embodiment of FIGS. 8a-8d), and the crop 14 has not yet been loaded onto the supply conveyor 91. Crop 14 may or may not be already be present in the hopper 20 at this point.

Figure 8B:
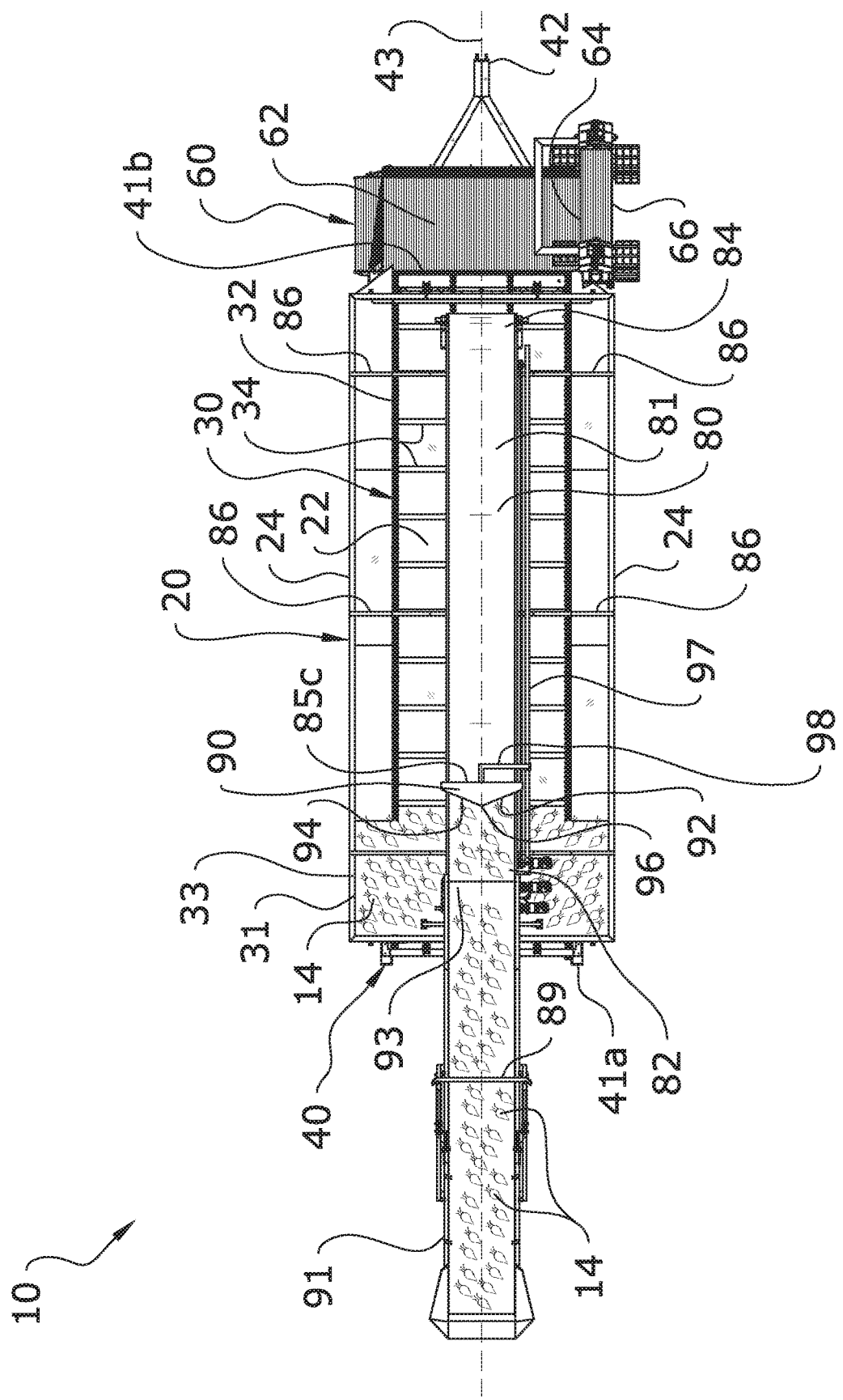
FIG. 8b is a top view of the crop cart of FIG. 1 in a first stage of rear to front loading.

FIG. 8b shows a configuration of the loading system in which the stopper 90 has been moved to the longitudinal position 85c at or adjacent the first end 82 of the conveyor 80, and the crop 14 is loaded into the hopper 20. The crop 14 is longitudinally translated across the output end 93 of the supply conveyor 91, and dropped onto the first end 82 of the conveyor 80.

Figure 8C:
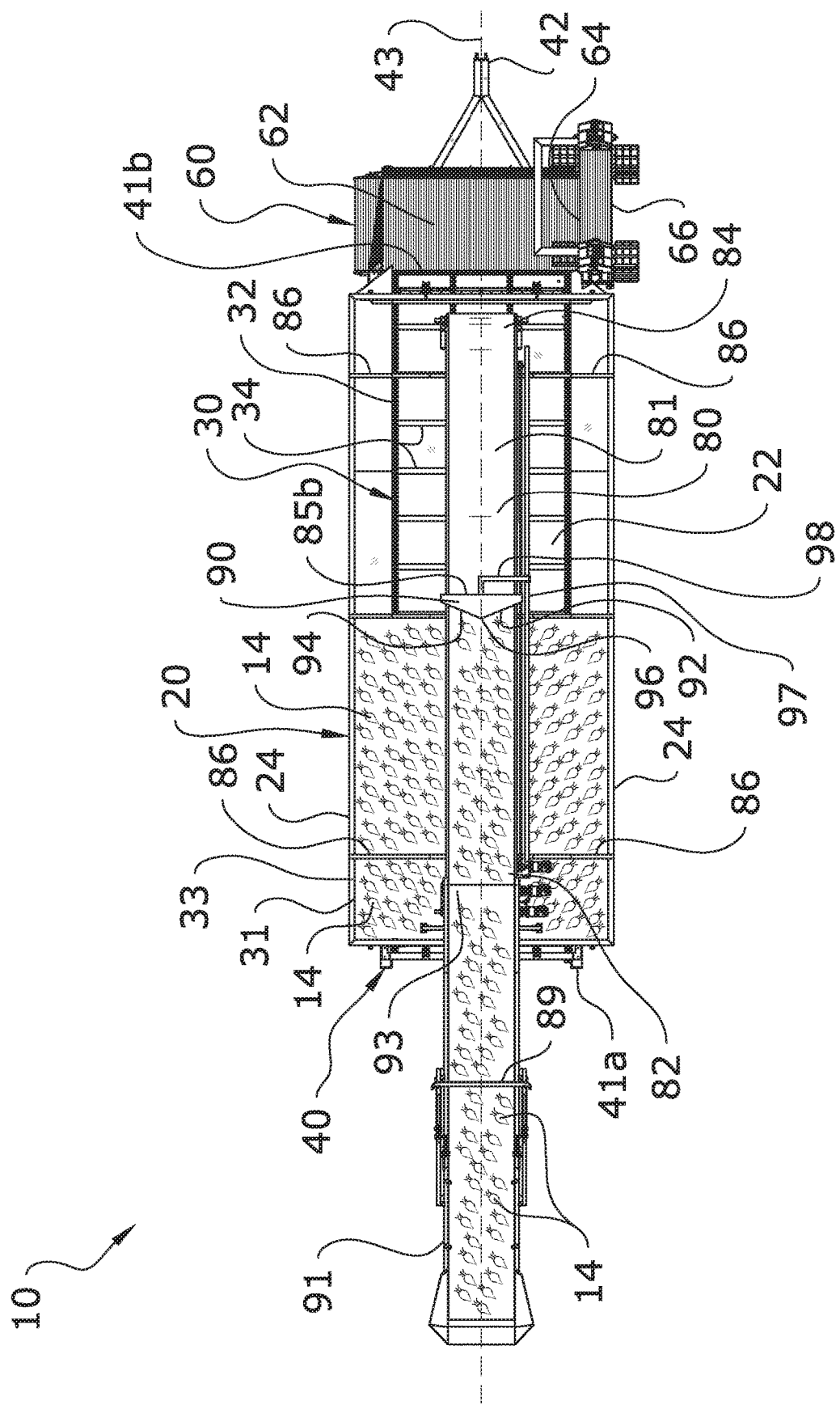
FIG. 8c is a top view of the crop cart of FIG. 1 in a second stage of rear to front loading.

FIG. 8c shows a configuration of the loading system in which the stopper 90 has been longitudinally positioned at about the longitudinal midpoint of the conveyor 80 (the longitudinal position 85b) and hopper 20. After the crop 14 reaches a certain level with the stopper 90 at the longitudinal position of FIG. 5b, the conveyor 80 is stopped and the stopper is moved to the longitudinal position of FIG. 5c. As shown, the crop 14 continues to fill up the hopper 20 between the second end 35b of the sidewall 24 and the middle of the hopper 20, though it will be appreciated that crop 14 will also start to back fill the floor 22 between the stopper 90 and the first end 35a.

Figure 8D:
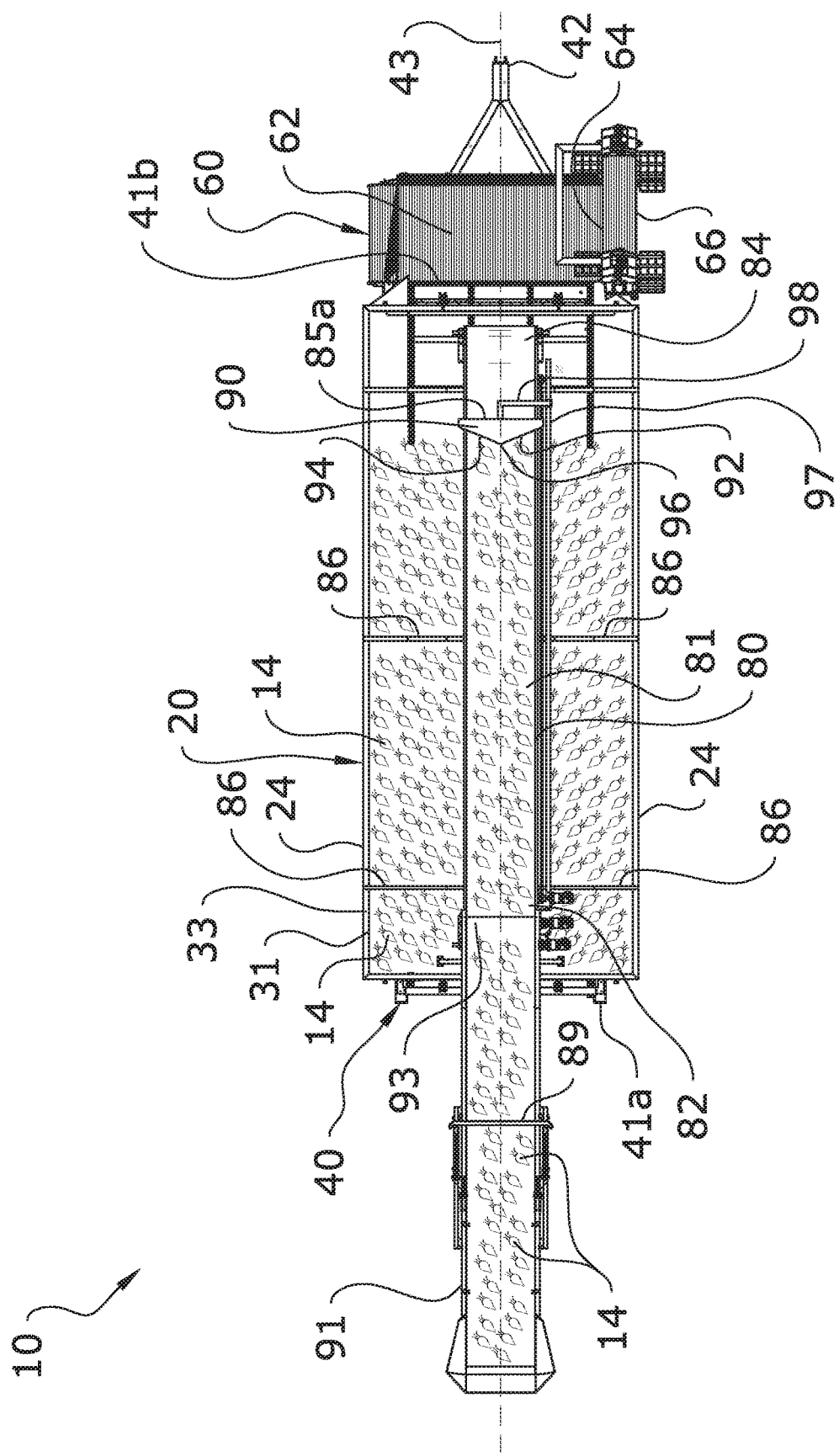
FIG. 8d is a top view of the crop cart of FIG. 1 in a third stage of rear to front loading.

FIG. 8d shows a configuration of the loading system in which the stopper 90 has been moved to the longitudinal position 85a at or adjacent the second end 84 of the conveyor 80. The crop 14 continues to be fed on to the conveyor 80 as discussed above, and longitudinally translated across substantially the entire length of the conveyor 80 before it is guided off of the conveyor 80 by the stopper 90.

The loading systems and methodologies described above for the crop cart system 10 can be repeated until the hopper 20 is filled with crop 14, or until the crop 14 reaches a desired level in the hopper 20. The hopper 20 can be filled in a single front to rear or rear to front operation as described above with respect to FIGS. 5a to 5d and FIGS. 8a to 8d, or through cycling between these operations. It will be appreciated that since the conveyor 80 and stopper 90 are detachable, the crop cart system 10 can additionally be used for various alternative functions without this loading system as described in U.S. Patent Publication No. 2016/0360704, which is incorporated by reference herein in its entirety. In particular, the user can connect a tractor to the hitch 42 of the support frame 40 and fluidly connect all of the actuators and drive motors to the hydraulic system of a tractor. Pulling the crop cart system 10 (without the elevated conveyor 80 and stopper 90) alongside a harvester with the hopper 20 in the lowered loading position, a harvester can fill the hopper 20 with a field crop 14 such as sugar beets. When the hopper 20 is full, the user can pull the crop cart system 10 to an unloading location to unload the field crop 14 to a transport vehicle to be transported to a desired location (e.g. a processing facility). The user can then lift the front end of the hopper 20 using the actuators 50, 52. Once the hopper 20 is fully elevated to an unloading height, the user can extend the unloading conveyor 60 outwardly to an extended position, and pull forwardly alongside the transport vehicle until the discharge end of the unloading conveyor 60 is aligned with the desired unloading location in the box of the transport vehicle. The user can then open the unloading door 28 and activate both the floor conveyor 30 and the unloading conveyor 60 to move the field crop 14 from the hopper 20 to the unloading conveyor 60, and then into the box of the transport vehicle. As the unloading conveyor 60 is horizontal or substantially horizontal during unloading, the field crop 14 does not roll back, and less hydraulic fluid is required to move the field crop 14 during unloading. Once the hopper 20 and unloading conveyor 60 are empty, the transport vehicle pulls forwardly and away from the crop cart system 10. The user then lowers the hopper 20 to the loading position and retracts the unloading conveyor 60.

Unless otherwise defined, all technical and scientific terms used herein have the same meaning as commonly understood by one of ordinary skill in the art to which this invention belongs. Although methods and materials similar to or equivalent to those described herein can be used in the practice or testing of the crop cart loading system, suitable methods and materials are described above. All publications, patent applications, patents, and other references mentioned herein are incorporated by reference in their entirety to the extent allowed by applicable law and regulations. The crop cart loading system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A crop cart, comprising:
    a hopper having a floor and a sidewall extending from the floor to an upper edge thereof, the sidewall defining a first end, a second end opposite the first end, an upper portion, and an interior space;
    a conveyor mounted to the hopper, the conveyor configured to receive and longitudinally translate a crop comprised of a harvested crop or seed along the upper portion of the hopper; and
    a stopper positioned above the conveyor, the stopper configured to stop longitudinal translation of the crop on an upper surface of the conveyor along the upper portion of the hopper;
    wherein the stopper is connected to an elongated member, wherein the elongated member is connected to a drive motor;
    wherein the stopper has a first front surface and a second front surface that divide the flow of the crop into a first crop flow and a second crop flow that are diverted off opposing sides of the conveyor into the hopper;
    wherein the stopper is connected to the conveyor in a movable manner, wherein the stopper moves longitudinally between a first end and a second end of the conveyor to correspondingly deposit the crop between the first end and the second of the hopper.

2. The crop cart of claim 1, wherein the stopper includes a front center point between the first front surface and the second front surface.

3. The crop cart of claim 2, wherein the front center point is aligned with a central longitudinal axis of the conveyor.

4. The crop cart of claim 1, wherein the first front surface and the second front surface are each curved.

5. The crop cart of claim 1, wherein the first front surface and the second front surface are each rounded.

6. The crop cart of claim 1, wherein the first front surface and the second front surface are each straight.

7. The crop cart of claim 1, wherein the stopper is wedge-shaped.

8. The crop cart of claim 1, wherein the stopper is wedge-shaped and configured to substantially equalize flow of the crop into the hopper on opposite sides of the hopper.

9. The crop cart of claim 1, wherein the first crop flow and the second crop flow are substantially equal to one another.

10. The crop cart of claim 1, wherein the stopper is substantially the same width as the conveyor.

11. The crop cart of claim 1, wherein the stopper is detachably connected to the conveyor.

12. The crop cart of claim 1, wherein the stopper is connected to an actuator that moves the stopper longitudinally between the first end and the second end of the conveyor.

13. The crop cart of claim 1, wherein the elongated member is comprised of a chain.

14. The crop cart of claim 1, wherein the conveyor is inclined relative to the upper edge of the sidewall such that the conveyor raises the crop relative to the hopper during longitudinal translation of the crop.

15. The crop cart of claim 1, wherein the conveyor is attached to the upper edge of the sidewall.

16. The crop cart of claim 1, including a floor conveyor operatively associated with the floor of the hopper and configured to move the crop within the interior space of the hopper.

17. The crop cart of claim 1, including a support frame having a front end, a rear end, and a plurality of wheels or a plurality of tracks for movably supporting the support frame above a ground surface, wherein the frame supports the hopper.

18. A crop cart, comprising:
    a support frame having a front end and a rear end;
    a plurality of wheels rotatably attached to the support frame or a plurality of tracks for movably supporting the support frame above a ground surface;
    a hopper connected to the support frame, wherein the hopper includes a floor and a sidewall extending from the floor to an upper edge thereof, the sidewall defining a first end, a second end opposite the first end, an upper portion, and an interior space;
    a conveyor mounted to the hopper, the conveyor configured to receive and longitudinally translate a crop comprised of a harvested crop or seed along the upper portion of the hopper;
    a stopper positioned above the conveyor, the stopper configured to stop longitudinal translation of the crop on an upper surface of the conveyor along the upper portion of the hopper;
    wherein the stopper is connected to an elongated member, wherein the elongated member is connected to a drive motor;
    wherein the stopper has a first front surface and a second front surface that divide the flow of the crop into a first crop flow and a second crop flow that are diverted off opposing sides of the conveyor into the hopper;
    wherein the first crop flow and the second crop flow are substantially equal to one another;
    wherein the stopper is connected to the conveyor in a movable manner, wherein the stopper moves longitudinally between a first end and a second end of the conveyor to correspondingly deposit the crop between the first end and the second end of the hopper; and a floor conveyor operatively associated with the floor of the hopper and configured to move the crop within the interior space of the hopper.

19. A crop cart, comprising:

a support frame having a front end and a rear end;

a plurality of wheels rotatably attached to the support frame or a plurality of tracks for movably supporting the support frame above a ground surface;

a hopper connected to the support frame, wherein the hopper includes a floor and a sidewall extending from the floor to an upper edge thereof, the sidewall defining a first end, a second end opposite the first end, an upper portion, and an interior space;

a conveyor mounted to the hopper, the conveyor configured to receive and longitudinally translate a crop comprised of a harvested crop or seed along the upper portion of the hopper;

a stopper positioned above the conveyor, the stopper configured to stop longitudinal translation of the crop on an upper surface of the conveyor along the upper portion of the hopper;

an elongated member connected to a drive motor, wherein the stopper is connected to the elongated member;

wherein the stopper has a first front surface and a second front surface that divide the flow of the crop into a first crop flow and a second crop flow that are diverted off opposing sides of the conveyor into the hopper;

wherein the first crop flow and the second crop flow are substantially equal to one another;

wherein the stopper is connected to the conveyor in a movable manner, wherein the stopper moves longitudinally between a first end and a second end of the conveyor to correspondingly deposit the crop between the first end and the second of the hopper; and a floor conveyor operatively associated with the floor of the hopper and configured to move the crop within the interior space of the hopper.

* * * * *